United States Patent
Hooper et al.

(10) Patent No.: US 10,434,888 B2
(45) Date of Patent: Oct. 8, 2019

(54) VEHICLE STORAGE AND CHARGING STATION

(71) Applicant: SPAWAR Systems Center Pacific, San Diego, CA (US)

(72) Inventors: Ralph David Hooper, Lemon Grove, CA (US); Jeffery Towns Gilchrist, Cardiff, CA (US); William A. Chambers, Jamul, CA (US); Bradley Joseph Easterwood, Madison, AL (US); Brett Paul Lassus, Huntsville, AL (US); Paul Michael Collins, Madison, AL (US); Samuel Thomas Edwards, Decatur, AL (US); Terry Lance Silas, Panama City Beach, FL (US); Marc Ludwig Roth, Owens Cross Roads, AL (US); Harry Lynn Barker, Madison, AL (US); Steven Dustin Bennett, Huntsville, AL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 350 days.

(21) Appl. No.: 15/629,568

(22) Filed: Jun. 21, 2017

(65) Prior Publication Data
US 2018/0370373 A1    Dec. 27, 2018

(51) Int. Cl.
*H02J 7/14* (2006.01)
*B60L 11/18* (2006.01)
(Continued)

(52) U.S. Cl.
CPC .......... *B60L 11/1824* (2013.01); *A62C 37/04* (2013.01); *A62C 37/40* (2013.01);
(Continued)

(58) Field of Classification Search
CPC .................................................. B60L 11/1824
(Continued)

(56) References Cited

U.S. PATENT DOCUMENTS

| 5,583,418 A | * | 12/1996 | Honda | .................. | B60L 53/305 |
| | | | | | 320/109 |
| 2001/0003416 A1 | * | 6/2001 | Kajiura | .................. | B60L 53/31 |
| | | | | | 320/109 |

(Continued)

OTHER PUBLICATIONS

Ron Butler; Managing the lithium (ion) battery fire risk; Industrial Fire Journal—Fire & Rescue, available online http://www.hemmingfire.com/news/fullstory.php/aid/1790; Jul. 23, 2013.
G. Lester; Remus Launch & Recovery Systems; available online at http://auvac.org/uploads/publication_pdf/Lester-REMUS%20LARS.pdf.
Hydroid; MCM RECCE UUV System; Product Description; available online at http://www.thinkdefence.co.uk/ship-to-shore-logistics/hydroid-remus-600-mcm-recce-uuv-system-components-2/.

* cited by examiner

*Primary Examiner* — Yalkew Fantu
(74) *Attorney, Agent, or Firm* — Naval Information Warfare Center Pacific; Kyle Eppele; J. Eric Anderson

(57) ABSTRACT

A vehicle charging station comprising: a container comprising an upper portion having an air duct, and a lower portion comprising a support structure, a smoke detector, a fire-suppressant inlet, and a charging/communications junction, wherein the upper portion is configured to mate with the lower portion to form a weather-tight enclosure around a vehicle, and wherein removal of the upper portion allows for loading/unloading of the vehicle into/out of the lower portion; and a resource control unit (RCU) comprising a processor, an environmental control unit (ECU), a fire-suppressant control manifold, and a charger, wherein the ECU is operatively coupled to the air duct, the fire-suppressant
(Continued)

control manifold is operatively coupled to the fire-suppressant inlet, the charger is electrically coupled to the charging/communications junction, and the processor is communicatively coupled to the smoke detector, the charging/communications junction, the ECU, the charger, and the fire-suppressant control manifold.

20 Claims, 5 Drawing Sheets

(51) Int. Cl.
      *A62C 37/40*       (2006.01)
      *B65G 1/02*       (2006.01)
      *H02J 7/00*       (2006.01)
      *A62C 37/36*       (2006.01)
      *B60L 53/31*       (2019.01)
      *A62C 3/16*       (2006.01)
      *A62C 3/10*       (2006.01)

(52) U.S. Cl.
    CPC ................ B60L 53/31 (2019.02); B65G 1/02 (2013.01); H02J 7/0042 (2013.01); *A62C 3/10* (2013.01); *A62C 3/16* (2013.01); *B60L 2200/32* (2013.01); *B60L 2250/10* (2013.01)

(58) Field of Classification Search
    USPC ........................................................ 320/104
    See application file for complete search history.

(56) References Cited

U.S. PATENT DOCUMENTS

| | | | |
|---|---|---|---|
| 2005/0194931 A1* | 9/2005 | Sobue | H02J 7/0026 320/116 |
| 2009/0066291 A1* | 3/2009 | Tien | H02J 7/0016 320/118 |
| 2013/0320923 A1* | 12/2013 | Hooker | B60L 3/0046 320/109 |

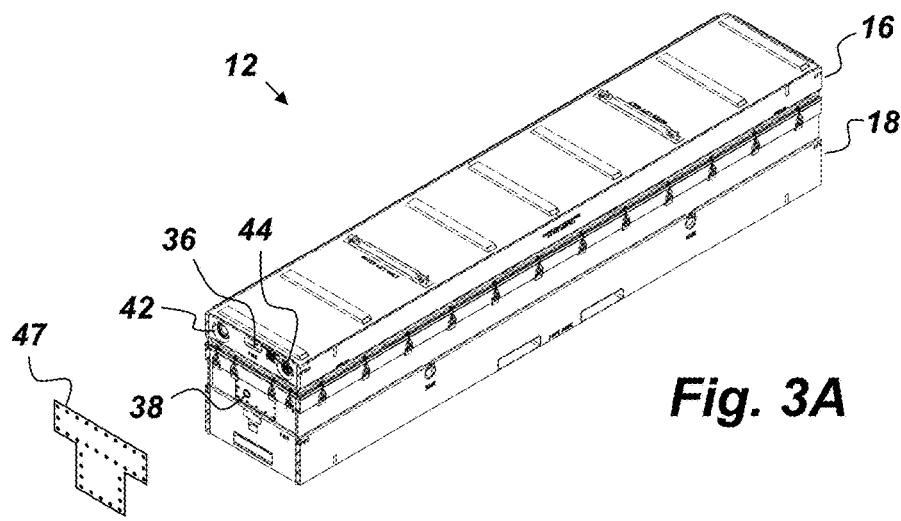
Fig. 3A
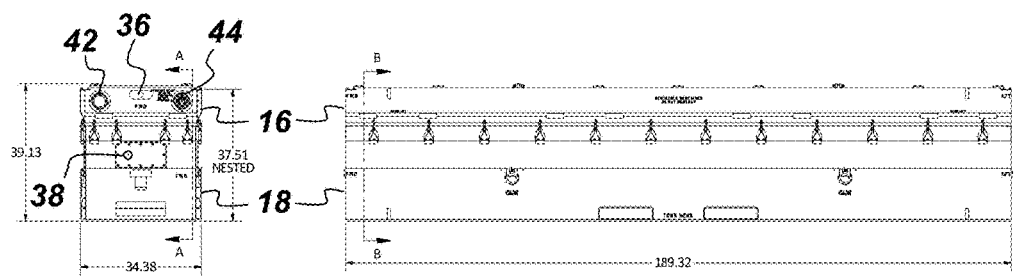
Fig. 3B  Fig. 3C
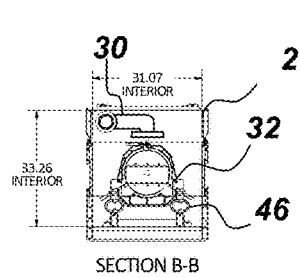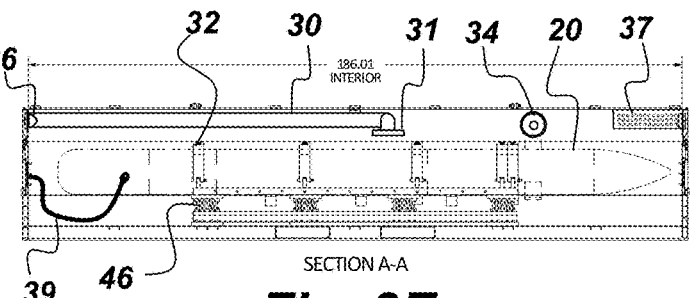
Fig. 3D  Fig. 3E

VEHICLE STORAGE AND CHARGING STATION

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 106063.

BACKGROUND OF THE INVENTION

The invention described and claimed herein relates to the field of vehicle storage and charging stations. Current charging/storage stations for vehicles can be bulky, and difficult to work with. For example, many unmanned underwater vehicles (UUVs), such as the MK 18 Mod 2 Kingfish, are transported and stored in an approximately 6×2.5×2.5 meter (20×8×8 feet) steel container, or MILVAN. Moving a MILVAN container requires a forklift or crane capable of lifting 9072-11340 kg (20-25K pounds). Moving the UUV in/out of the MILVAN container can require a significant amount of floor space to perform the procedure. Many vehicles contain delicate sensors and electronics that need more protection than current charging/storage stations offer. There is a need for an improved vehicle storage/charging station.

SUMMARY

Described herein is a vehicle charging station comprising a container and a resource control unit (RCU). The container comprises upper and lower portions. The upper portion has an air duct and is configured to mate with the lower portion to form a weather-tight enclosure around a vehicle. The lower portion comprises a support structure, a smoke detector, a fire-suppressant inlet, and a charging/communications junction. Removal of the upper portion allows for loading/unloading of the vehicle into/out of the lower portion. The RCU comprises a processor, an environmental control unit (ECU), a fire-suppressant control manifold, and a charger. The ECU is operatively coupled to the air duct. The fire-suppressant control manifold is operatively coupled to the fire-suppressant inlet. The charger is electrically coupled to the charging/communications junction. The processor is communicatively coupled to the smoke detector, the charging/communications junction, the ECU, the charger, and the fire-suppressant control manifold.

An embodiment of the vehicle charging station may be described as comprising a container, a support structure, an air duct, a smoke detector, a charging/communications junction, a fire-suppressant inlet, and an RCU. The container has an upper portion and a lower portion where the upper portion is configured to mate with the lower portion to form a weather-tight enclosure around a vehicle. Removal of the upper portion allows for loading/unloading of the vehicle into/out of the lower portion. The support structure, which is configured to inhibit movement of the vehicle in three dimensions with respect to the support structure, is mounted with shock isolation mounts to an interior of the lower portion. The air duct, which is mounted within an interior of the upper portion, connects an air inlet in a front-wall of the upper portion to a vent that is positioned within the upper portion such that when the upper portion is mated to the lower portion the vent is located proximal to a battery compartment of the vehicle. The smoke detector is mounted to the interior of the lower portion of the container. The charging/communications junction, which is mounted in a front-wall of the lower portion, has a receptacle on an exterior of the lower portion's front-wall and is configured to be electrically and communicatively coupled to the vehicle when the vehicle is held in the support structure. The fire-suppressant inlet, which is mounted in the front-wall of the lower portion, is positioned in the lower portion's front-wall such that when fire-suppressant fluid enters the fire-suppressant inlet the fluid exits into the interior of the container and impinges on the battery compartment of the vehicle until the vehicle is completely immersed in fire-suppressant. In this embodiment, the RCU comprises a processor, an ECU, a fire-suppressant control manifold, and a charger. The ECU is operatively coupled to the air inlet. The fire-suppressant control manifold is operatively coupled to the fire-suppressant inlet. The charger is electrically coupled to the charging/communications junction, and the processor is communicatively coupled to the smoke detector, the charging/communications junction, the ECU, the charger, and the fire-suppressant control manifold.

BRIEF DESCRIPTION OF THE DRAWINGS

Throughout the several views, like elements are referenced using like references. The elements in the figures are not drawn to scale and some dimensions are exaggerated for clarity.

FIG. 3A is a perspective view of a prototype container.

FIG. 3B is a front view of a prototype container.

FIG. 3C is a side view of a prototype container.

FIG. 3D is a front, interior section view of a prototype container.

FIG. 3E is a side, interior section view of a prototype container.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
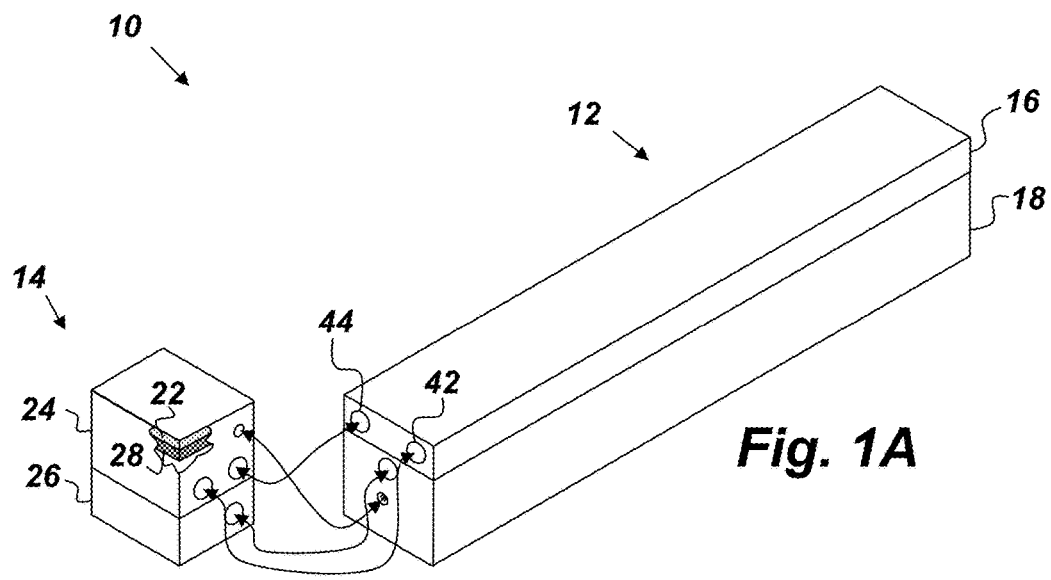
FIG. 1A is a perspective view of a vehicle charging station.
Figure 1B:
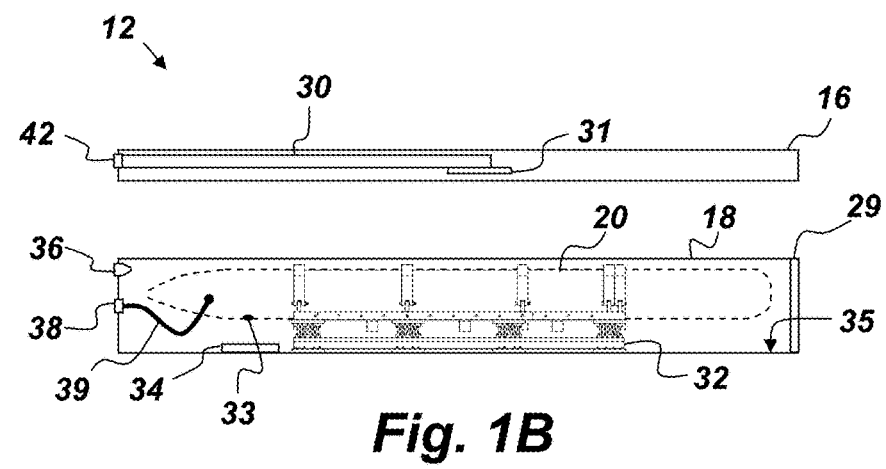
FIG. 1B is an interior, side-view of a container.
Figure 5:
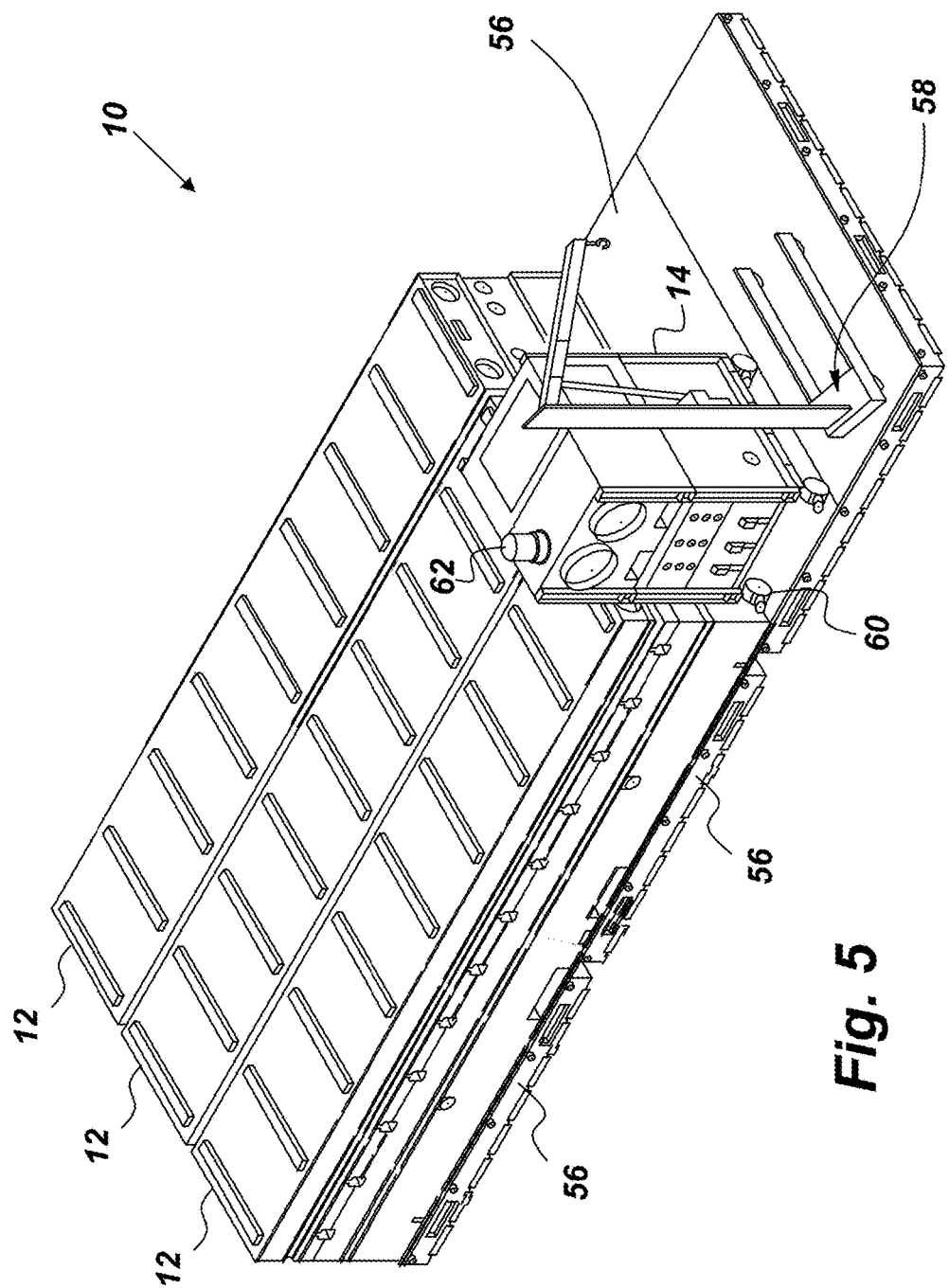
FIG. 5 is a perspective view of an embodiment of a vehicle charging station.

FIG. 1A is a perspective view of an embodiment of a vehicle charging station 10 that comprises, consists of, or consists essentially of a container 12 and a resource control unit (RCU) 14. The container 12 comprises an upper portion 16 and a lower portion 18. The upper portion 16 is configured to mate with the lower portion 18 to form a weather-tight enclosure around a vehicle 20 (such as is depicted in FIG. 1B). The vehicle charging station 10 provides a safe means for storing, transporting, and charging the vehicle 20, which may be any vehicle that requires recharging. Suitable examples of the vehicle 20 include, but are not limited to, unmanned underwater vehicles (UUVs), unmanned aerial vehicles (UAVs), autonomous underwater vehicles (AUVs), and tele-operated vehicles. The RCU 14 comprises, consists of, or consists essentially of a processor 22, an environmental control unit (ECU) 24, a fire-suppressant control manifold 26, and a charger 28. The RCU 14 may also include a step-down transformer to allow for different power inputs/outputs to/from the RCU 14. In one embodiment, such as is depicted in FIG. 5, the RCU 14 may be mounted on wheels to allow it to be easily moved by hand. FIG. 1B is an interior side view of the container 12. In the embodiment of the container 12 shown in FIGS. 1A and 1B, the upper portion 16 has an air duct 30 that is operatively coupled to the ECU 24 via an air inlet 42. The ECU 24 is configured to force air into the air inlet 42 where it travels through the air duct 30 and exits into the container 12 via an air vent 31. Air from the interior of the container 12 exits via an air outlet 44 and may be routed back to the ECU 24. In the embodiment of the container 12 shown in FIGS. 1A and 1B, the lower portion 18 comprises a support structure 32, a smoke detector 34, a fire-suppressant inlet 36, and a charging/communications junction 38. Removal of the upper portion 16 allows for loading/unloading of the vehicle 20 into/out of the lower portion 18. The fire-suppressant control manifold 26 is operatively coupled to the fire-suppressant inlet 36. The charger 28 is electrically coupled to the charging/communications junction 38. The processor 22 is communicatively coupled to the smoke detector 34, the charging/communications junction 38, the ECU 24, the charger 28, and the fire-suppressant control manifold 26.

Figure 4:
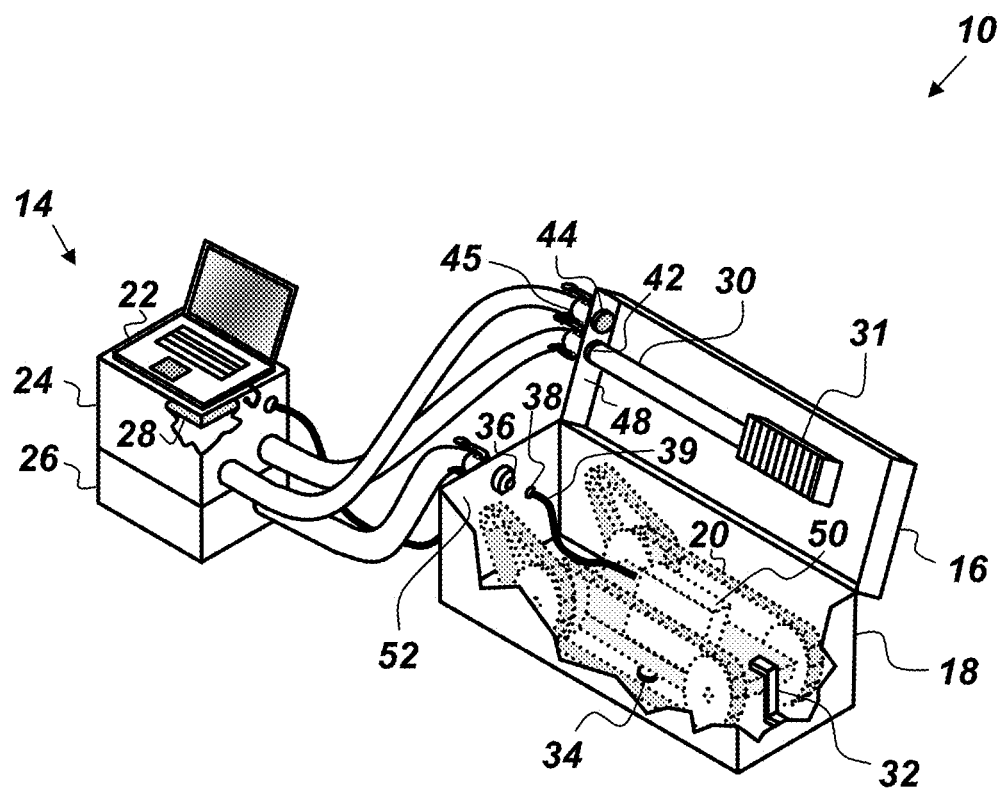
FIG. 4 is a perspective view of an embodiment of a vehicle charging station.

The container 12 may be made of any material (e.g., steel, aluminum, wood, fiberglass, carbon fiber, etc.) capable of supporting the vehicle and may be any size and shape. For example, in an embodiment of the charging station 10 depicted in FIGS. 3A-3E, the container 12 is an aluminum, rectangular box having a total volume that is no greater than three times the volume of the UUV vehicle 20 which is contained therein. When the upper portion 16 and the lower portion 18 of the container 12 are mated together and when the container 12 is connected to the RCU 14, the interior of the container 12 provides a weather-tight enclosure for the vehicle 20. As used herein, the term "weather-tight" means providing shelter from rain, wind, and sun (although the container 12 may have an optional viewing window, which is not shown). When the container 12 is disconnected from the RCU 14, an optional cover (such as cover 47 shown in FIG. 3A) may be attached to the container 12 to cover the air inlet 42, the fire suppressant inlet and the charging/communications junction to provide a watertight and airtight enclosure around the vehicle 20. The container 12 also may optionally be lined with insulating material designed to reduce heat transfer to/from the interior of the container 12. Rectangle 29 in FIG. 1B represents insulating material (such as foam, fiber-glass batting, etc.) that may be used to line the exterior or interior of the container 12. The container 12 may also comprise an optional desiccant chamber 37, shown in FIG. 3E, mounted to the interior of either the upper portion 16 or the lower portion 18. It is to be understood that the fire-suppressant inlet 36, the air inlet 42, the air outlet 44, the charging/communications junction 38 may be positioned in either the upper portion 16 or the lower portion 18 of the container 12 in any desired combination and/or arrangement. The fire-suppressant inlet 36, the air inlet 42, and the air outlet 44 may be attached/detached to/from the RCU 14 with quick connect/disconnect fittings 45 (as depicted in FIG. 4). A suitable, non-limiting, example of a quick connect fitting is a cam lock quick release fitting.

The ECU 24 is controlled by the processor 22 and provides heating, ventilation, and air conditioning (HVAC) by forcing air to/from the interior of the container 12. The ECU 24 may be any HVAC unit capable of being controlled by the processor 22 and interfacing with the air duct 30. The vehicle charging station 10 may further comprise a temperature sensor configured to send interior container temperature data to the processor 22. The temperature sensor may be mounted to any location on/in the container 12 or proximal to a return air duct of the ECU 24. The RCU 14 may also use remote temperature sensing means to monitor the interior temperature of the container 12. The processor 22 may be any logic circuit capable of controlling the ECU 24, the fire-suppressant control manifold 26, and the charger 28 based, at least in part, on inputs received from the smoke detector 34. In one embodiment, the processor 22 may be a thermostat of the ECU 24. For example, in operation, a user may enter with an interface on the RCU 14 a desired interior temperature for the container 12 and the ECU 24's thermostat may monitor the temperature of air returning from the container 12. Continuing with the example, if the sensed temperature rises above a first threshold value then the processor 22 (which is the ECU 24's thermostat in this example) will engage its air conditioner to send cool air into the container 12 until the sensed temperature drops below a second threshold. The processor 22 may be an internal processor that is built into the RCU 14. Alternatively, the processor 22 may be a general purpose computer. The processor 22 is configured to communicate with an onboard processor on the vehicle 20 in order to monitor the charging of the vehicle 20. The processor may be configured to provide visual and/or audible alarms in the event a problem occurs during the charging process (e.g., the temperature of the batteries exceeds a threshold temperature, an electrical short condition is detected, etc.). For example, a warning message may flash on a screen such as on the example of the processor 22 shown in FIG. 4, or a flashing light may be mounted to the RCU 14 or the container 12 that is having the problem. The audible alarm may be a recorded alarm sound generated by a speaker and/or an alarm bell, whistle, and/or horn. The processor 22 may be electrically and communicatively coupled to the vehicle 20 via the charging/communications junction 38. In the interior of the container 12, the charging/communications junction 38 may be connected to an electrical pigtail 39, which may be plugged into the vehicle 20.

Upon receiving a fault signal from the vehicle 20, a temperature reading above an upper threshold, and/or an output from the smoke detector 34 indicating the presence of smoke, the processor 22 may be configured to: (1) open the fire suppressant control manifold 26 to allow fire suppressant to flow into the container 12 until the vehicle 20 is completely immersed in the fire suppressant; (2) cut power to the charger 28; and/or (3) cease moving air into/out of the container 12. The fire suppressant may be any fluid (gas or liquid) capable of extinguishing fire. Suitable examples of the fire suppressant include, but are not limited to, water and fire-suppressant foam. If fire-suppressant foam is used it may be stored in a fire-suppressant storage tank which may be mounted on or in the RCU 14 or on or in the container 12. In one embodiment, the fire-suppressant control manifold 26 may be tied into a ship's fire control system that provides fire-suppressant throughout a ship. Although the smoke detector 34 is shown in FIG. 1B as being mounted to an interior bottom surface 35 of the lower portion 18 proximal to a blowout plug 33 on the vehicle 20, it is to be understood that the smoke detector 34 may be mounted in any desired location such that the smoke detector 34 is positioned so as to be able to detect smoke within the container 12. The blowout plug 33 allows smoke to escape the vehicle 20 in the event of a battery fire within the vehicle 20.

Figure 2:
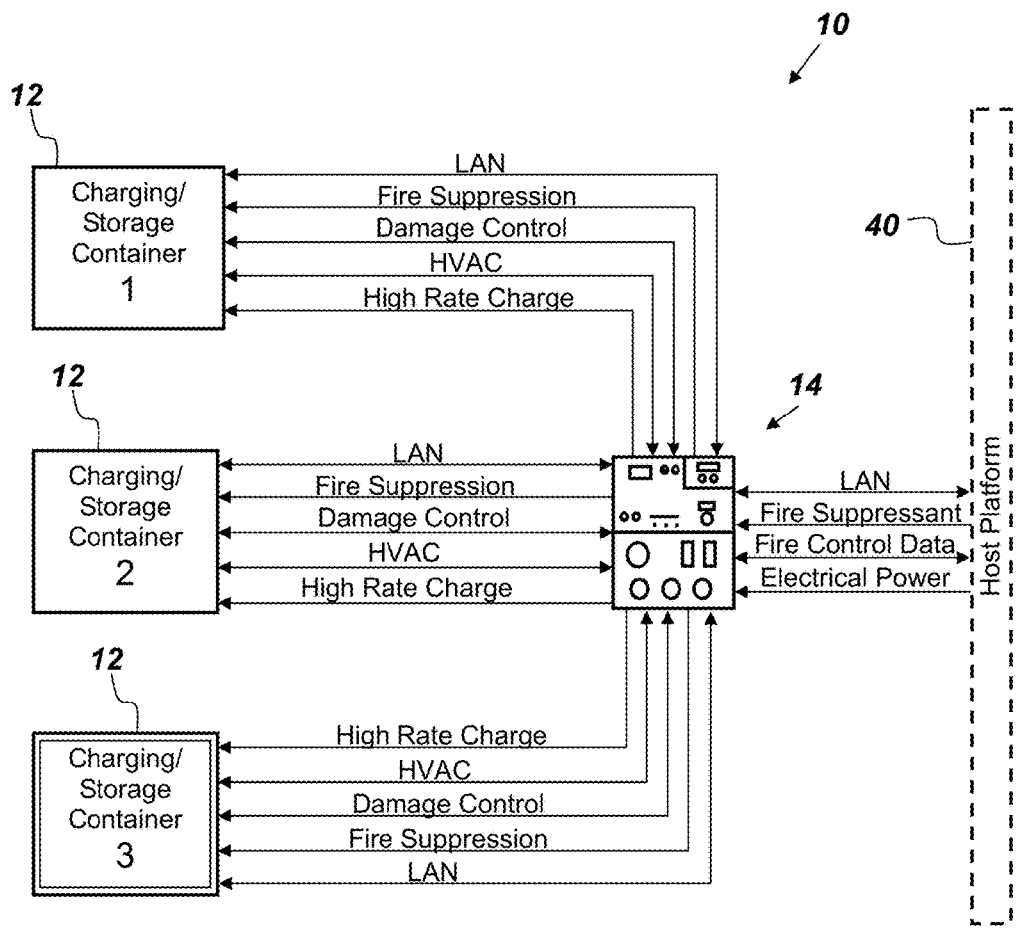
FIG. 2 is a schematic of a vehicle charging station.

FIG. 2 is an illustration of an embodiment of the charging station 10 where a single RCU 14 is connected to three containers 12. A single RCU 14 may be used to connect to multiple containers 12. FIG. 2 also shows the various connections between the RCU 14 and each container 12 and a host platform 40. The vehicle charging station 10 may serve as a forward operating base (FOB) charging station for any vehicle 20 that requires recharging. Suitable examples of the host platform 40 include, but are not limited to, a ship, a boat, a floating platform, an aircraft, a land-based vehicle, and a land-based facility. In the embodiment of the charging station 10 shown in FIG. 2, the RCU 14 receives fire-suppressant and electrical power from the host platform; in addition, the RCU shares fire control data and a LAN connection with the host platform 40. If the vehicle 20 has lithium ion batteries, the container 12 will provide a means of safely charging the lithium ion batteries within the enclosure. In the event a battery fire occurs, or smoke is detected, the charging station 10 is designed to react automatically to flood the container 12 with fire-suppressant thereby protecting personnel that may be near and mitigating damage to the vehicle 20. During charging of the batteries the ECU 24 is configured to circulate cool air through the container 12 in order to prevent a thermal runaway situation. The ECU 24 may also be configured to heat the container 12 to keep the vehicle 20 at a desired temperature.

FIGS. 3A-3E are illustrations of a prototype embodiment of the container 12. FIG. 3A is a perspective view, FIG. 3B is a front view, FIG. 3C is a side view, FIG. 3D is a front, interior section view, and FIG. 3E is a side, interior section view of the prototype embodiment. In this embodiment, there is shown the air inlet 42 that is coupled to the internal air duct 30. There is also an air outlet 44 that is configured to allow air to exit the container 12. Both the air inlet 42 and the air outlet 44 may be connected to the ECU 24 (not shown in FIGS. 3A-3E). An embodiment of the support structure 32 is shown in FIGS. 3D and 3E. In this embodiment, the support structure 24 is mounted with shock isolation mounts 46 to an interior of the lower portion 18. The support structure 24 holds the vehicle 20 securely in three dimensions and also provides shock isolation to protect the vehicle 20 while it is undergoing transit such that the vehicle 20 can be safely transported via air. The shock isolation inhibits large enough movements of the vehicle 20 in any direction when mounted in the support structure 24 that would cause the vehicle 20 to come in contact with an inner wall of the container 12. The support structure 24 may comprise a set of adjustable clamps to accommodate different size vehicles 20. FIG. 3A also shows an optional cover 47 that is designed to cover the fire-suppressant inlet 36 and the charging/communications junction 38. The optional cover 47 may be affixed to the container 12 by fasteners, such as bolts and screws and/or by clamps such as quick release clamps. When affixed to the container 12, the cover 47 may provide a water/air-tight seal such that no water or air enters the container 12. The optional cover 47 may comprise a pressure-relief valve (not shown).

FIG. 4 is an illustration of another embodiment of the vehicle charging station 10. In this embodiment, a portion of the lower portion 18 is cut away to facilitate view into the interior of the container 12. Also in this embodiment, the processor 22 is a general purpose computer and the vehicle 20 is a tracked vehicle. FIG. 4 shows how the air duct 20 may be connected to the air inlet 42 in a front-wall 48 of the upper portion 16 to the vent 31 that is positioned within the upper portion 16 such that when the upper portion 16 is mated to the lower portion 18 the vent 31 is located proximal to a battery compartment 50 of the vehicle 20. In the embodiment of the vehicle charging station 10 shown in FIG. 4, the charging/communications junction 38 is mounted in a front-wall 52 of the lower portion 18 and is electrically and communicatively coupled to the vehicle 20. In this embodiment, the fire-suppressant inlet 36 is also positioned in the lower portion's front-wall 52 such that when fire-suppressant fluid enters the fire-suppressant inlet 36 the fluid exits into the interior of the container 12 and impinges on the battery compartment 50 of the vehicle 20.

FIG. 5 is a perspective illustration of an embodiment of the vehicle charging station 10 arranged for shipping/transport. In FIG. 5, the vehicle charging station 10 is shown as comprising three containers 12 and the RCU 14 arranged on a master pallet 56, which may be, for example, a 463L-type master pallet or a pallet designed for cargo, e.g., military air cargo. FIG. 5 also shows a floor crane 58, which may be used to remove the vehicle 20 from any given container 12. The containers 12 may be nested vertically. In this embodiment of the vehicle charging station 10, the RCU 14 is mounted on wheels 60 and has an alarm light 62.

From the above description of the vehicle charging station 10, it is manifest that various techniques may be used for implementing the concepts of vehicle charging station 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the vehicle charging station 10 is not limited to the particular embodiments described herein, but is capable of many embodiments without departing from the scope of the claims.

We claim:

1. A vehicle charging station comprising:
   a container comprising an upper portion having an air duct and a fire-suppressant inlet, and a lower portion comprising a support structure, a smoke detector, and a charging/communications junction, wherein the upper portion is configured to mate with the lower portion to form a weather-tight enclosure around a vehicle, and wherein removal of the upper portion allows for loading/unloading of the vehicle into/out of the lower portion; and
   a resource control unit (RCU) comprising a processor, an environmental control unit (ECU), a fire-suppressant control manifold, and a charger, wherein the ECU is operatively coupled to the air duct, the fire-suppressant control manifold is operatively coupled to the fire-suppressant inlet, the charger is electrically coupled to the charging/communications junction, and the processor is communicatively coupled to the smoke detector, the charging/communications junction, the ECU, the charger, and the fire-suppressant control manifold.

2. The vehicle charging station of claim 1, wherein the support structure is mounted with shock isolation mounts to an interior of the lower portion, and wherein the support structure is configured to inhibit movement of the vehicle in three dimensions with respect to the support structure.

3. The vehicle charging station of claim 2, wherein the air duct connects an air inlet in a front-wall of the upper portion to a vent that is positioned within the upper portion such that when the upper portion is mated to the lower portion the vent is located proximal to a battery compartment of the vehicle.

4. The vehicle charging station of claim 3, wherein the smoke detector is mounted to an interior bottom surface of the lower portion.

5. The vehicle charging station of claim 4, wherein the charging/communications junction is mounted in a front-wall of the lower portion and comprises a receptacle on an exterior of the lower portion's front-wall, and wherein the charging/communications junction is configured to be electrically and communicatively coupled to the vehicle when the vehicle is held in the support structure.

6. The vehicle charging station of claim 5, wherein the fire-suppressant control manifold is designed to be tied into a ship's fire control system.

7. The vehicle charging station of claim 6, further comprising a removable, water/air-tight cover designed to be mounted to an exterior of the container so as to form a water/air-tight cover over the fire-suppressant inlet, the charging/communications junction, and the air inlet.

8. The vehicle charging station of claim 5, wherein the fire-suppressant inlet is positioned in the upper portion's front-wall such that when fire-suppressant fluid enters the fire-suppressant inlet the fluid exits into the interior of the container and impinges on the battery compartment of the vehicle.

9. The vehicle charging station of claim 8, further comprising a removable, water/air-tight cover designed to be mounted to an exterior of the front-wall of the lower portion so as to cover the fire-suppressant inlet and the charging/communications junction.

10. The vehicle charging station of claim 9, wherein the water/air-tight cover is also designed to form a water/air-tight seal over the air inlet.

11. The vehicle charging station of claim 1, further comprising a plurality of containers as described in claim 1, wherein each of the containers is coupled to the RCU in the manner described in claim 1.

12. The vehicle charging station of claim 1, wherein the processor is programmed to monitor the charging of the vehicle and to automatically open the fire-suppressant manifold to allow fire suppressant fluid to flood the container upon receiving a smoke detection signal from the smoke detector or a fault signal from the charger.

13. A vehicle charging station comprising:
a container having an upper portion and a lower portion, wherein the upper portion is configured to mate with the lower portion to form a weather-tight enclosure around a vehicle, and wherein removal of the upper portion allows for loading/unloading of the vehicle into/out of the lower portion;
a support structure mounted with shock isolation mounts to an interior of the lower portion, wherein the support structure is configured to inhibit movement of the vehicle in three dimensions with respect to the support structure;
an air duct mounted within an interior of the upper portion, wherein the air duct connects an air inlet in a front-wall of the upper portion to a vent that is positioned within the upper portion such that when the upper portion is mated to the lower portion the vent is located proximal to a battery compartment of the vehicle;
a smoke detector mounted to the interior of the lower portion;
a charging/communications junction mounted in a front-wall of the lower portion and having a receptacle on an exterior of the lower portion's front-wall, wherein the charging/communications junction is configured to be electrically and communicatively coupled to the vehicle when the vehicle is held in the support structure;
a fire-suppressant inlet mounted in the front-wall of the lower portion, wherein the fire-suppressant inlet is positioned in the lower portion's front-wall such that when fire-suppressant fluid enters the fire-suppressant inlet the fluid exits into the interior of the container and impinges on the battery compartment of the vehicle until the vehicle is completely immersed in fire-suppressant;
a resource control unit (RCU) comprising a processor, an environmental control unit (ECU), a fire-suppressant control manifold, and a charger, wherein the ECU is operatively coupled to the air inlet, the fire-suppressant control manifold is operatively coupled to the fire-suppressant inlet, the charger is electrically coupled to the charging/communications junction, and the processor is communicatively coupled to the smoke detector, the charging/communications junction, the ECU, the charger, and the fire-suppressant control manifold.

14. The vehicle charging station of claim 13, wherein the container has a total volume that does not exceed three times a total volume of the vehicle.

15. The vehicle charging station of claim 14, wherein the smoke detector is mounted to a bottom surface of an aft section of the interior of the lower portion such that when the vehicle is held in the support structure the smoke detector is proximal to a blowout plug of the vehicle.

16. The vehicle charging station of claim 14 wherein the support system comprises size-adjustable clamps designed to secure unmanned, underwater vehicles.

17. The vehicle charging station of claim 14, wherein the interiors of the upper and lower portions are lined with insulating material.

18. The vehicle charging station of claim 13, further comprising a plurality of containers as described in claim 13, wherein each of the containers is coupled to the RCU in the manner described in claim 13.

19. The vehicle charging station of claim 13, wherein the processor is programmed to monitor the charging of the vehicle and to automatically open the fire-suppressant manifold to allow fire suppressant fluid to flood the container upon receiving a smoke detection signal from the smoke detector or a fault signal from the charger.

20. The vehicle charging station of claim 19, wherein the processor is programed to provide visual and audible alarms in the event of receiving a smoke detection signal from the smoke detector or a fault signal from the charger.

* * * * *